US012621844B2

(12) United States Patent
Fu

(10) Patent No.: US 12,621,844 B2
(45) Date of Patent: May 5, 2026

(54) METHOD AND APPARATUS FOR DETERMINING TRANSPORT BLOCK SIZE

(71) Applicant: BEIJING XIAOMI MOBILE SOFTWARE CO., LTD., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 404 days.

(21) Appl. No.: 18/273,759

(22) PCT Filed: Jan. 22, 2021

(86) PCT No.: PCT/CN2021/073212
§ 371 (c)(1),
(2) Date: Jul. 21, 2023

(87) PCT Pub. No.: WO2022/155877
PCT Pub. Date: Jul. 28, 2022

(65) Prior Publication Data
US 2024/0107555 A1 Mar. 28, 2024

(51) Int. Cl.
*H04W 72/23* (2023.01)
*H04L 1/00* (2006.01)
(Continued)

(52) U.S. Cl.
CPC ......... *H04W 72/232* (2023.01); *H04L 1/0003* (2013.01); *H04L 1/0007* (2013.01); *H04W 72/0446* (2013.01)

(58) Field of Classification Search
CPC ........... H04W 72/1289; H04W 72/231; H04W 72/23; H04W 72/11; H04W 72/0446;
(Continued)

(56) References Cited

U.S. PATENT DOCUMENTS

2019/0174466 A1* 6/2019 Zhang ................... H04L 5/0057
2020/0022117 A1* 1/2020 Dong ........................ H04L 1/08
(Continued)

FOREIGN PATENT DOCUMENTS

CN 110830161 A 2/2020
CN 111436144 A 7/2020

OTHER PUBLICATIONS

International Search Report of PCT/CN2021/073212 dated Oct. 9, 2021 with English translation, (4p).
(Continued)

*Primary Examiner* — Wei Zhao
(74) *Attorney, Agent, or Firm* — Arch & Lake LLP; Hao Tan; Shen Wang

(57) ABSTRACT
The present disclosure relates to a method for determining transport block size, which includes: receiving downlink control information sent by a base station, where the downlink control information is configured to schedule a plurality of transmission time intervals; determining, based on the downlink control information, a target resource corresponding to a target transmission time interval among the plurality of transmission time intervals; and determining a transport block size corresponding to each transmission time interval of the plurality of transmission time intervals based on the target resource and a modulation and coding scheme in the downlink control information.

13 Claims, 3 Drawing Sheets

Receive downlink control information sent by base station, wherein downlink control information is used for scheduling plurality of transmission time intervals — S101

Determine target resource corresponding to target transmission time interval among plurality of transmission time intervals according to downlink control information — S102

Determine transport block size corresponding to each transmission time interval among plurality of transmission time intervals according to target resource and modulation and coding scheme in downlink control information — S103

(51) Int. Cl.
  *H04W 72/0446*       (2023.01)
  *H04W 72/232*        (2023.01)
(58) Field of Classification Search
  CPC ... H04W 72/232; H04W 52/02; H04W 72/14;
         H04L 5/0048; H04L 5/0091; H04L 5/004
  See application file for complete search history.

(56)                  References Cited

U.S. PATENT DOCUMENTS

2020/0169351 A1     5/2020   Yoshimura et al.
2020/0404694 A1 *  12/2020   Gao ................. H04W 72/0446

OTHER PUBLICATIONS

Qualcomm Incorporated, "Downlink Data Channel Design for Shortened TTI", 3GPP TSG RAN WG1 #87 Nov. 14-18, 2016 Reno, Nevada, USA,R1-1611640, (6p).

* cited by examiner

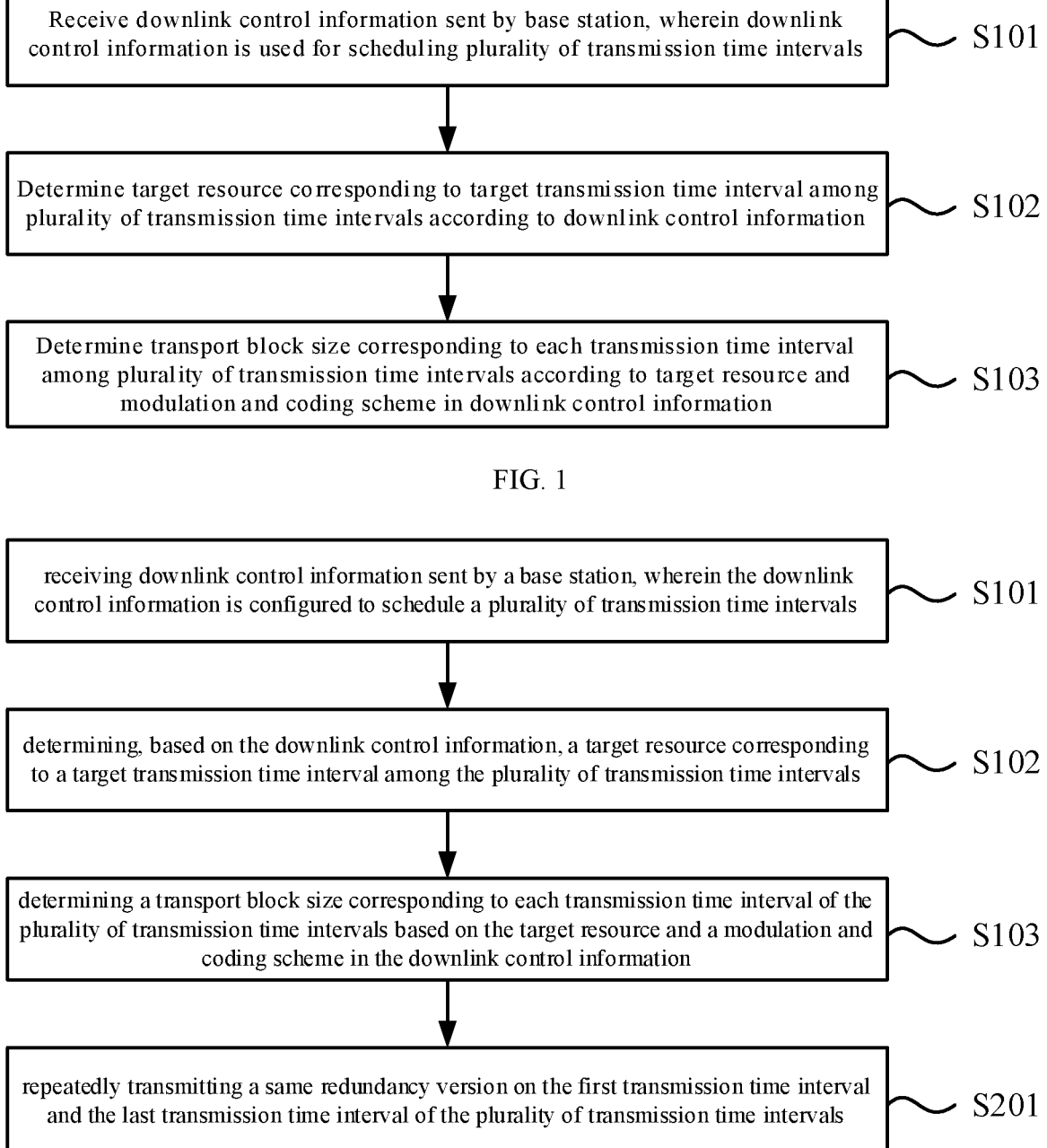

Receive downlink control information sent by base station, wherein downlink control information is used for scheduling plurality of transmission time intervals    ∽ S101

Determine target resource corresponding to target transmission time interval among plurality of transmission time intervals according to downlink control information    ∽ S102

Determine transport block size corresponding to each transmission time interval among plurality of transmission time intervals according to target resource and modulation and coding scheme in downlink control information    ∽ S103

FIG. 1 receiving downlink control information sent by a base station, wherein the downlink control information is configured to schedule a plurality of transmission time intervals    ∽ S101 determining, based on the downlink control information, a target resource corresponding to a target transmission time interval among the plurality of transmission time intervals    ∽ S102 determining a transport block size corresponding to each transmission time interval of the plurality of transmission time intervals based on the target resource and a modulation and coding scheme in the downlink control information    ∽ S103 repeatedly transmitting a same redundancy version on the first transmission time interval and the last transmission time interval of the plurality of transmission time intervals    ∽ S201

FIG. 2

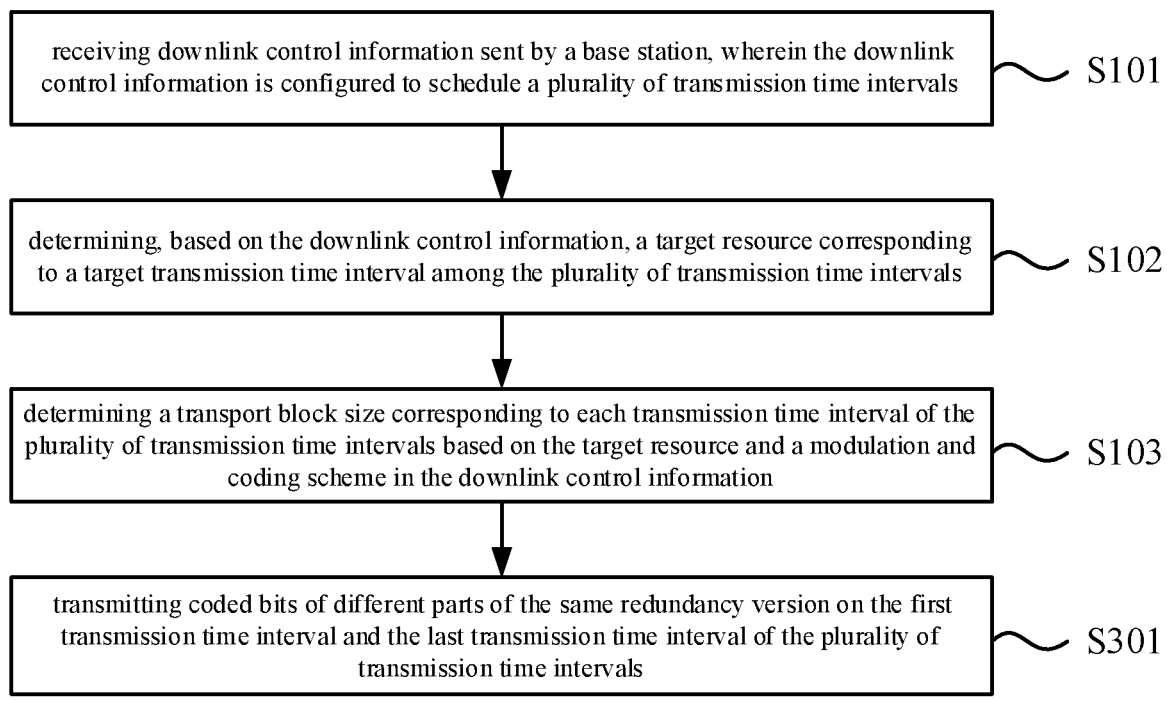

receiving downlink control information sent by a base station, wherein the downlink control information is configured to schedule a plurality of transmission time intervals — S101 determining, based on the downlink control information, a target resource corresponding to a target transmission time interval among the plurality of transmission time intervals — S102 determining a transport block size corresponding to each transmission time interval of the plurality of transmission time intervals based on the target resource and a modulation and coding scheme in the downlink control information — S103 transmitting coded bits of different parts of the same redundancy version on the first transmission time interval and the last transmission time interval of the plurality of transmission time intervals — S301

FIG. 3

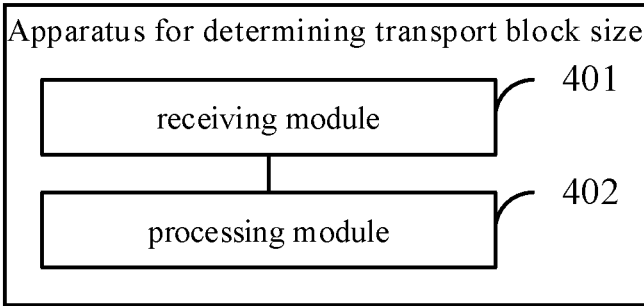

Apparatus for determining transport block size receiving module — 401 processing module — 402

FIG. 4

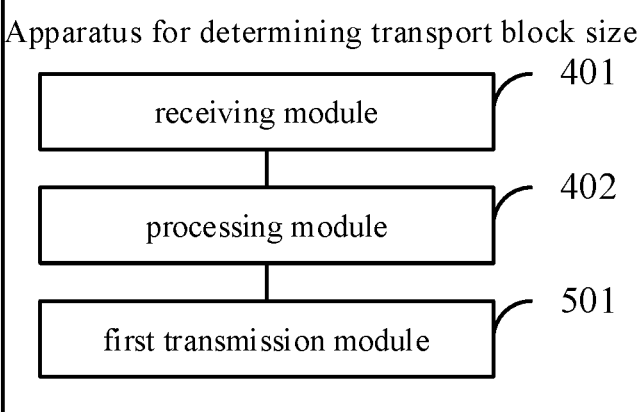

Apparatus for determining transport block size receiving module — 401 processing module — 402 first transmission module — 501

FIG. 5

Apparatus for determining transport block size

| receiving module | 401 |
| processing module | 402 |
| second transmission module | 601 |

700

702

704 — memory

706 — power supply component

708 — multimedia component

710 — audio component processing component

720 processor communication component — 716 sensor component — 714

I/O interface — 712

METHOD AND APPARATUS FOR DETERMINING TRANSPORT BLOCK SIZE

CROSS-REFERENCE TO RELATED APPLICATION

The present application is the U.S. National phase application of International Application No. PCT/CN2021/073212, filed on Jan. 22, 2021, the entire content of which is incorporated herein by reference for all purposes.

TECHNICAL FIELD

The present disclosure relates to the field of communication technology, and in particular, to a method and apparatus for determining a transport block size, a communication device, and a computer-readable storage medium.

BACKGROUND

As a Subcarrier Spacing (SCS) increases, a length of a slot decreases accordingly, e.g. for a SCS of 960 KHz, the slot is only $\frac{1}{64}$ milliseconds.

In order to accommodate this short slot, the current technique is to use multiple transmission time interval scheduling (multi-TTI scheduling), i.e., scheduling multiple transmission time intervals with a single piece of Downlink Control Information (DCI).

Here, the transmission time interval corresponds to the slot, and resources allocated on each slot are the same. A terminal can determine, based on a code rate of Modulation and Coding Scheme (MCS) carried by the downlink control information and the resources allocated on the slot, a size of transport block(s) that can be encoded and transmitted on these resources.

SUMMARY

In view of the above, embodiments of the present disclosure propose a method and apparatus for determining a transport block size, a communication device, and a computer-readable storage medium, to solve the technical problems in the related art.

According to a first aspect of the present disclosure, a method for determining a transport block size is proposed, the method including:

receiving downlink control information sent by a base station, wherein the downlink control information is configured to schedule a plurality of transmission time intervals;

determining, based on the downlink control information, a target resource corresponding to a target transmission time interval among the plurality of transmission time intervals; and determining a transport block size corresponding to each transmission time interval of the plurality of transmission time intervals based on the target resource and a modulation and coding scheme in the downlink control information.

According to a second aspect of the present disclosure, a communication device is proposed, the communication device including:

a processor; and a memory for storing one or more instructions executable by the processor;

wherein the processor is configured to perform the method for determining the transport block size as described above.

According to a third aspect of the present disclosure, a non-transitory computer-readable storage medium is proposed for storing a computer program, wherein the program, when executed by a processor, causes the processor to implement steps in the method for determining the transport block size as described above.

BRIEF DESCRIPTION OF THE DRAWINGS

In order to more clearly illustrate the technical solutions in the embodiments of the present disclosure, the accompanying drawings, which are to be used in the description of the embodiments, will be briefly described below. It is obvious that the accompanying drawings in the following description are only some of the embodiments of the present disclosure, and for those of ordinary skill in the art, other drawings can be obtained based on these drawings without creative labor.

FIG. 1 is a schematic flowchart of a method for determining a transport block size illustrated according to embodiments of the present disclosure.

FIG. 2 is a schematic flowchart of another method for determining a transport block size illustrated according to embodiments of the present disclosure.

FIG. 3 is a schematic flowchart of yet another method for determining a transport block size illustrated according to embodiments of the present disclosure.

FIG. 4 is a schematic block diagram of an apparatus for determining a transport block size illustrated according to embodiments of the present disclosure.

FIG. 5 is a schematic block diagram of another apparatus for determining a transport block size illustrated according to embodiments of the present disclosure.

DETAILED DESCRIPTION

Figures 6, 7:
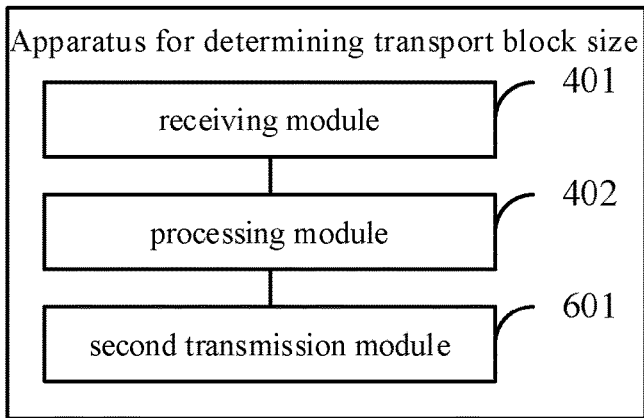
FIG. 6 is a schematic block diagram of yet another apparatus for determining a transport block size illustrated according to embodiments of the present disclosure.
FIG. 7 is a schematic block diagram of a device for determining a transport block size illustrated according to embodiments of the present disclosure.

The technical solutions in the embodiments of the present disclosure will be clearly and completely described below in conjunction with the accompanying drawings in the embodiments of the present disclosure. It is apparent that the described embodiments are only a part of the embodiments of the present disclosure, and not all of them. Based on the embodiments in the present disclosure, all other embodiments obtained by a person of ordinary skill in the art without making creative labor fall within the scope of protection of the present disclosure.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

FIG. 1 is a schematic flowchart of a method for determining a transport block size illustrated according to embodiments of the present disclosure. The method for determining the transport block size illustrated in these embodiment can be applied to a terminal, the terminal including, but not limited to, a communication device such as a cell phone, a tablet, a wearable device, a sensor, an IoT device, and the like. The terminal can serve as a user device to communicate with a base station, the base station including, but not limited to, a 4G base station, a 5G base station and a 6G base station.

As shown in FIG. 1, the method for determining the transport block (TB) size may include the following steps.

Step S101, receiving downlink control information sent by a base station, wherein the downlink control information is configured to schedule a plurality of transmission time intervals (TTIs).

Step S102, determining, based on the downlink control information, a target resource corresponding to a target transmission time interval among the plurality of transmission time intervals.

Step S103, determining a transport block size corresponding to each transmission time interval of the plurality of transmission time intervals based on the target resource and a modulation and coding scheme in the downlink control information.

In one embodiment, the method for determining the transport block size can be applied to communication in an unlicensed frequency band, so resources corresponding to the plurality of transmission time intervals are also in the unlicensed frequency band. In the unlicensed frequency band, the terminal will start to occupy the channel for communication when it detects that the channel is idle. In this case, there is no need to perform multiple detections, so the plurality of transmission time intervals can be configured to be consecutive in the time domain, and the occupying of the channel can be ended after the communication is completed.

In this case, the moment of occupying the channel may not correspond to the start symbol of the slot, and the moment of releasing the channel may not correspond to the end symbol of the slot. This leads to the fact that, since the transmission time interval and the slot are still corresponding, the slots corresponding to some of the plurality of transmission time intervals are incomplete and correspond to a relatively small amount of resources.

For example, when the plurality of transmission time intervals (TTIs) are k TTIs, and the channel starts to be occupied from symbol S of slot n and ends to be occupied by symbol E of slot n+k, the first TTI corresponds to symbol S to an end symbol of slot n, the last TTI corresponds to a start symbol to symbol E of slot n+k, and the other TTIs, i.e., the second TTI to the $(k-1)^{th}$ TTI, each corresponds to a complete slot. Here, n and k are positive integers.

Accordingly, when symbol S is not a start symbol, the number of symbols in slot n corresponding to the first TTI is relatively small and corresponds to a relatively small amount of resources. Here, the resource can be either the resource element (RE) or the resource block (RB). Similarly, when symbol E is not an end symbol, the number of symbols in slot n+k corresponding to the last TTI is relatively small. In most cases, symbol S is not the start symbol and symbol E is not the end symbol, so the TTI corresponding to a smaller number of symbols has fewer corresponding resources.

For example, the first TTI corresponds to N1 REs, each of the second TTI to the $(k-1)^{th}$ TTI corresponds to N2 REs, and the last TTI corresponds to N3 REs. In general, symbol S is not a start symbol, and symbol E is not an end symbol, so N1 is less than N2, and N3 is less than N2. In the special case that symbol S is a start symbol, then N1 is equal to N2, or symbol E is an end symbol, then N1 is equal to N3. In addition, in some cases, N2 can also be equal to N3, or even N1, N2 and N3 are equal.

The following is mainly an exemplary description for the case in which N1 is smaller than N2 and N3 is smaller than N2. In this case, since only one modulation and coding scheme is carried in the downlink control information, when a plurality of transmission time intervals are for the same transport block, i.e., when repeated transmissions of the same transport block are required, different transport block sizes will be determined based on different resources corresponding to different TTIs and the code rate, which is not applicable to multiple instances of scheduling of the same transport block.

According to embodiments of the present disclosure, the target transmission time interval can be determined among the plurality of transmission time intervals, and the target resource for scheduling a slot corresponding to the target transmission time interval can be determined based on the downlink control information. Furthermore, the transport block size can be determined according to the target resource and the modulation and coding scheme (e.g., a code rate in the MCS) carried in the downlink control information, to be applicable to each of the plurality of transmission time intervals, thereby ensuring that the transport block size determined for each transmission time interval is the same so that multiple instances of scheduling of the same transport block can be applied to repeatedly send the transport block.

In one embodiment, the target transmission time interval is a transmission time interval among the plurality of transmission time intervals that corresponds to a minimum amount of resources.

In one embodiment, among the plurality of transmission time intervals, a transmission time interval corresponding to a minimum amount of resources can be determined as the target transmission time interval.

For example, for the k TTIs described above, since the slot corresponding to the first TTI and the slot corresponding to the last TTI are generally incomplete, whereas all of the slots corresponding to the second TTI to the $(k-1)^{th}$ TTI are complete, the TTI corresponding to the minimum amount of resources can be determined between the first TTI and the last TTI as the target transmission time interval.

Since the downlink control information carries one kind of modulation and coding scheme, in which there can be only one code rate, and the target transmission time interval corresponds to the fewest target resources, the transport block size that is determined according to the target resources and the code rate in the modulation and coding scheme is smaller. Thus, in the subsequent channel coding process, when channel coding is carried out for the transport block corresponding to the transmission time interval that corresponds to a larger amount of resources, the code rate adopted will not exceed the code rate in the downlink control information, which is conducive to ensuring good demodulation performance.

For example, the first TTI among the k TTIs corresponds to the fewest resources having 20 REs, the code rate in the MCS is 1/2, and the determined transport block size is X bits, then subsequently, in the actual channel coding process, the channel coding can be performed for the transport block of X bits, and for the resources corresponding to the first TTI, the code rate used in channel coding is still 1/2, which can be determined based on the 20 REs and X bits.

Further, for the second TTI to the $(k-1)^{th}$ TTI, if each of which corresponds to 50 REs, in the channel coding process, when the channel coding is performed for the transport block of X bits, the code rate used is 1/5, which can be determined based on 50 REs and X bits, and it is smaller than the code rate of 1/2 indicated in the MCS of DCI, thus conducive to ensuring good demodulation performance.

In one embodiment, the target transmission time interval is a transmission time interval among the plurality of transmission time intervals that corresponds to a maximum amount of resources.

In one embodiment, among the plurality of transmission time intervals, a transmission time interval corresponding to a maximum amount of resources can be determined as the target transmission time interval.

For example, for the k TTIs described above, since the slot corresponding to the first TTI and the slot corresponding to the last TTI are generally incomplete, whereas all of the slots corresponding to the second TTI to the $(k-1)^{th}$ TTI are complete, a TTI can be determined among the second TTI to the $(k-1)^{th}$ TTI as the target transmission time interval.

Since the downlink control information carries one kind of modulation and coding scheme, in which there can be only one code rate, and the target transmission time interval corresponds to the most target resources, the transport block size that is determined according to the target resources and the code rate in the modulation and coding scheme is larger, whereby the channel coding can be performed for the transport block of a larger number of bits to the resources corresponding to each TTI in the plurality of TTIs, which is helpful to ensure resource efficiency.

In one embodiment, the target transmission time interval is a first transmission time interval of the plurality of transmission time intervals, or the target transmission time interval is a last transmission time interval of the plurality of transmission time intervals.

In one embodiment, the first one or the last one, among the plurality of transmission time intervals, can be determined as the target transmission time interval.

For example, for the k TTIs described above, since the slot corresponding to the first TTI and the slot corresponding to the last TTI are generally incomplete, whereas all of the slots corresponding to the second TTI to the $(k-1)^{th}$ TTI are complete, the first TTI and the last TTI correspond to fewer resources in general, and thus, a TTI can be determined between the first TTI and the last TTI as the target transmission time interval.

Since the downlink control information carries one kind of modulation and coding scheme, in which there can be only one code rate, and when the first transmission time interval, or the last transmission time interval is taken as the target transmission time interval, the target transmission time interval corresponds to a relatively small number of target resources, and the transport block size that is determined according to the target resources and the code rate in the modulation and coding scheme is smaller. Thus, in the subsequent channel coding process, when channel coding is performed for the transport block corresponding to the transmission time interval that corresponds to a larger amount of resources, it is helpful to ensure that the code rate adopted will not exceed the code rate in the downlink control information, which is conducive to ensuring good demodulation performance.

For example, when the first TTI among k TTIs is selected as the target transmission time interval, the first TTI corresponds to resources of 20 REs, the code rate in the MCS is 1/2, and the determined transport block size is X bits, then subsequently, in the actual channel coding process, channel coding can be performed for the transport block of X bits, and the code rate used for channel coding is still 1/2 for the resources corresponding to the first TTI.

Further, for the second TTI to the $(k-1)^{th}$ TTI, if each of which corresponds to 50 REs, the code rate used is 1/5 in the channel coding process when the channel coding is performed for the transport block of X bits, which is smaller than the code rate of 1/2 indicated in the MCS of DCI, thus conducive to ensuring good demodulation performance.

In one embodiment, the target transmission time interval is a transmission time interval among the plurality of transmission time intervals that is other than a first transmission time interval and a last transmission time interval of the plurality of transmission time intervals.

In one embodiment, among the plurality of transmission time intervals, a transmission interval other than the first one and the last one of the plurality of transmission time intervals can be determined as the target transmission interval.

For example, for the k TTIs described above, since the slot corresponding to the first TTI and the slot corresponding to the last TTI are generally incomplete, whereas all of the slots corresponding to the second TTI to the $(k-1)^{th}$ TTI are complete, any of the TTIs from the second TTI to the $(k-1)^{th}$ TTI can be used as the target transmission time interval.

Since the downlink control information carries one kind of modulation and coding scheme, in which there can be only one code rate, and the transmission time intervals other than the first transmission time interval and the last transmission time interval correspond to a relatively large number of target resources, the transport block size that is determined based on the target resources and the code rate in the modulation and coding scheme is relatively large, whereby the channel coding can be performed for the transport block of a larger number of bits to the resources corresponding to each TTI in the plurality of TTIs, which is helpful to ensure resource efficiency.

FIG. 2 is a schematic flowchart of another method for determining a transport block size illustrated according to embodiments of the present disclosure. As shown in FIG. 2, in some embodiments, on the basis of the method shown in FIG. 1, the method further includes the following steps.

Step S201, repeatedly transmitting a same redundancy version (RV) on the first transmission time interval and the last transmission time interval of the plurality of transmission time intervals.

In one embodiment, in the case of using the transmission time interval other than the first transmission time interval and the last transmission time interval among the plurality of transmission time intervals as the target transmission time interval, the channel coding can be performed for the transport block of a larger number of bits to the resources corresponding to each TTI in the plurality of TTIs. It is conducive to ensuring the resource efficiency, but may lead to some transmission time intervals corresponding to fewer resources, e.g., the first and the last transmission time intervals, to use a larger code rate in the subsequent channel coding process, affecting the demodulation effect.

In this embodiment, the same redundancy version can be repeatedly transmitted on the first transmission time interval and the last transmission time interval of the plurality of transmission time intervals, which is equivalent to reducing the code rate for channel coding of the transport block corresponding to the first and the last transmission time intervals, and thus mitigating the impact on the demodulation effect.

In one embodiment, the same redundancy version is redundancy version 0 or redundancy version 3.

Here, redundancy version 0 and redundancy version 3 are self-decodable redundancy versions, so when the self-decodable redundancy version needs to be transmitted on the first TTI and the last TTI, the decoding may be completed even if the transmission is completed only on the first TTI, which is helpful to ensure that the content on the resources corresponding to the TTIs can be decoded successfully even if the transmission is not fully completed.

FIG. 3 is a schematic flowchart of yet another method for determining a transport block size illustrated according to embodiments of the present disclosure. As shown in FIG. 3, in some embodiments, on the basis of the method shown in FIG. 1, the method further includes the following steps.

Step S301, transmitting coded bits of different parts of the same redundancy version on the first transmission time interval and the last transmission time interval of the plurality of transmission time intervals.

In one embodiment, in the case of using the transmission time interval other than the first transmission time interval and the last transmission time interval among the plurality of transmission time intervals as the target transmission time interval, the channel coding can be performed for the transport block of a larger number of bits to the resources corresponding to each TTI in the plurality of TTIs. It is conducive to ensuring the resource efficiency, but may lead to some transmission time intervals corresponding to fewer resources, e.g., the first and the last transmission time intervals, to use a larger code rate in the subsequent channel coding process, affecting the demodulation effect.

In this embodiment, the coded bits of different parts of the same redundancy version can be transmitted on the first transmission time interval and the last transmission time interval among the plurality of transmission time intervals. That is, the first TTI and the last TTI can be regarded as a single TTI, and the resources corresponding to this TTI are regarded as a whole to carry the coded bits after coding the transport block corresponding to the first TTI and the transport block corresponding to the last TTI, which is equivalent to the number of times of the repeated sending of the transport block is reduced by one, and can also reduce the code rate for coding the transport block corresponding to the first transmission time interval and the last transmission time interval, and therefore mitigates the impact on the demodulation effect.

Corresponding to the foregoing embodiments of the method for determining the transport block size, the present disclosure further provides embodiments of an apparatus for determining a transport block size.

FIG. 4 is a schematic block diagram of an apparatus for determining a transport block size illustrated according to embodiments of the present disclosure. The apparatus for determining the transport block size illustrated in this embodiment can be applied to a terminal, the terminal including, but not limited to, a communication device such as a cell phone, a tablet, a wearable device, a sensor, an IoT device, and the like. The terminal can serve as a user device to communicate with a base station, the base station including, but not limited to, a 4G base station, a 5G base station and a 6G base station.

As shown in FIG. 4, the apparatus for determining the transport block size may include:

a receiving module 401 configured to receive downlink control information sent by a base station, wherein the downlink control information is configured to schedule a plurality of transmission time intervals; and a processing module 402 configured to determine, based on the downlink control information, a target resource corresponding to a target transmission time interval among the plurality of transmission time intervals;

wherein the processing module 402 is further configured to determine a transport block size corresponding to each transmission time interval of the plurality of transmission time intervals based on the target resource and a modulation and coding scheme in the downlink control information.

In one embodiment, the target transmission time interval is a transmission time interval among the plurality of transmission time intervals that corresponds to a minimum amount of resources.

In one embodiment, the target transmission time interval is a transmission time interval among the plurality of transmission time intervals that corresponds to a maximum amount of resources.

In one embodiment, the target transmission time interval is a first transmission time interval of the plurality of transmission time intervals, or the target transmission time interval is a last transmission time interval of the plurality of transmission time intervals.

In one embodiment, the target transmission time interval is a transmission time interval among the plurality of transmission time intervals that is other than a first transmission time interval and a last transmission time interval of the plurality of transmission time intervals.

FIG. 5 is a schematic block diagram of another apparatus for determining a transport block size illustrated according to embodiments of the present disclosure. As shown in FIG. 5, on the basis of the apparatus shown in FIG. 4, the apparatus further includes:

a first transmission module 501 configured to repeatedly transmit a same redundancy version on the first transmission time interval and the last transmission time interval of the plurality of transmission time intervals.

In one embodiment, the same redundancy version is redundancy version 0 or redundancy version 3.

FIG. 6 is a schematic block diagram of yet another apparatus for determining a transport block size illustrated according to embodiments of the present disclosure. As shown in FIG. 6, on the basis of the apparatus shown in FIG. 4, the apparatus further includes:

a second transmission module 601 configured to transmit coded bits of different parts of the same redundancy version on the first transmission time interval and the last transmission time interval of the plurality of transmission time intervals.

In one embodiment, the plurality of transmission time intervals are consecutive in a time domain.

In one embodiment, the plurality of transmission time intervals correspond to resources in an unlicensed frequency band.

With respect to the apparatus in the above embodiments, the specific manner in which each module performs an operation has been described in detail in the embodiments of the relevant method, and will not be described in detail herein.

For the apparatus or device embodiments, since they correspond substantially to the method embodiments, it is sufficient to refer to a part of the description of the method embodiments where relevant. The above-described apparatus embodiments are merely schematic, in which the modules described as separate components may or may not be physically separated, and the components shown as modules may or may not be physical modules, i.e., they may be located in one place or may be distributed to a plurality of network modules. Some or all of these modules may be selected to fulfill the purpose of the scheme of the embodiments according to actual needs. It can be understood and implemented by a person of ordinary skill in the art without creative labor.

Embodiments of the present disclosure further propose a communication device, the communication device including:

a processor; and a memory for storing one or more instructions executable by the processor;

wherein the processor is configured to perform the method for determining the transport block size described in any of the above embodiments.

Embodiments of the present disclosure further propose a computer-readable storage medium for storing a computer program, the program being executed by a processor to cause the processor to implement the steps in the method for determining the transport block size described in any of the above embodiments.

FIG. 7 is a schematic block diagram of a device 700 used for determining a transport block size illustrated according to embodiments of the present disclosure. For example, the device 700 may be a cell phone, a computer, a digital broadcast terminal, a message sending and receiving device, a game console, a tablet device, a medical device, a fitness device, a personal digital assistant, etc.

Referring to FIG. 7, the device 700 may include one or more of the following components: processing component 702, memory 704, power supply component 706, multimedia component 708, audio component 710, input/output (I/O) interface 712, sensor component 714, and communication component 716.

The processing component 702 generally controls the overall operation of device 700, such as operations associated with display, telephone call, data communication, camera operation, and recording operations. The processing component 702 may include one or more processors 720 to execute instructions to complete all or some of the steps of the methods described above. In addition, the processing component 702 may include one or more modules that facilitate interaction between processing component 702 and other components. For example, the processing component 702 may include a multimedia module to facilitate interaction between the multimedia component 708 and the processing component 702.

The memory 704 is configured to store various types of data to support operation at the device 700. Examples of such data include instructions for any application or method operating on the device 700, contact data, phonebook data, messages, pictures, videos, etc. The memory 704 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, Disk or CD-ROM.

The power supply component 706 provides power to various components of the device 700. The power supply component 706 may include a power management system, one or more power supplies, and other components associated with generating, managing, and distributing power for the device 700.

The multimedia component 708 includes a screen that provides an output interface between the device 700 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some embodiments, the multimedia component 708 includes a front-facing camera and/or a rear-facing camera. The front-facing camera and/or rear-facing camera can receive external multimedia data when the device 700 is in an operating mode, such as shooting mode or video mode. Each front-facing camera and rear-facing camera may be a fixed optical lens system or have focal length and optical zoom capability.

The audio component 710 is configured to output and/or input audio signals. For example, the audio component 710 includes a microphone (MIC) configured to receive external audio signals when the device 700 is in an operating mode, such as call mode, record mode, and voice recognition mode. The received audio signal may be further stored in memory 704 or sent via communication component 716. In some embodiments, the audio component 710 further includes a speaker for outputting the audio signal.

The I/O interface 712 provides an interface between the processing component 702 and the peripheral interface modules, and the peripheral interface modules may be keypads, click wheels, buttons, etc. These buttons may include, but are not limited to: home button, volume button, start button, and lock button.

The sensor component 714 includes one or more sensors for providing status assessment of various aspects of the device 700. For example, the sensor component 714 may detect an open/closed state of the device 700, the relative positioning of components, such as the components being the display and keypad of the device 700, and the sensor component 714 may also detect a change in position of the device 700 or a component of the device 700, the presence or absence of user contact with the device 700, the orientation of the device 700 or acceleration/deceleration, and temperature changes of the device 700. The sensor component 714 may include a proximity sensor configured to detect the presence of nearby objects in the absence of any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication between the device 700 and other devices by wired or wireless means. The device 700 may access a wireless network based on a communication standard such as WiFi, 2G or 3G, 4G LTE, 5G NR, or a combination thereof. In one exemplary embodiment, the communication component 716 receives broadcast signals or broadcast-related information from an external broadcast management system via a broadcast channel. In an exemplary embodiment, the communication component 716 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In exemplary embodiments, the device 700 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the above methods.

In exemplary embodiments, there is also provided a non-transitory computer readable storage medium including instructions, such as a memory 704 including instructions, the instructions being executable by the processor 720 of the device 700 to accomplish the methods described above. For example, the non-transitory computer readable storage medium may be ROM, random access memory (RAM), CD-ROM, magnetic tape, floppy disk, and optical data storage device, among others.

Other embodiments of the present disclosure will readily come to the mind of those skilled in the art upon consideration of the specification and practice of the disclosure disclosed herein. The present disclosure is intended to cover any variation, use, or adaptation of this disclosure that follows the general principles of this disclosure and includes commonly known or customary technical means in the art that are not disclosed herein. The specification and embodiments are to be considered exemplary only, and the true scope and spirit of the present disclosure is indicated by the following claims.

It should be understood that the present disclosure is not limited to the precise construction already described above and illustrated in the accompanying drawings, and that various modifications and changes may be made without departing from its scope. The scope of the present disclosure is limited only by the appended claims.

It should be noted that in this document, relationship terms such as "first" and "second" are used only to distinguish one entity or operation from another, without necessarily requiring or implying any such actual relationship or order between those entities or operations. The terms "including/comprising," "containing," or any other variation thereof, are intended to cover non-exclusive inclusion so that a process, method, object, or apparatus that includes a set of elements includes not only those elements, but also other elements not explicitly listed, or also includes elements inherent in such a process, method, object, or apparatus. Without further limitations, an element defined by the phrase "including/comprising one of . . . " does not preclude the existence of additional identical elements in the process, method, object, or apparatus that includes the element.

The methods and devices provided by the embodiments of the present disclosure are described in detail above, and specific examples are applied in this disclosure to illustrate the principles and implementation of the present disclosure. The above description of the embodiments is only used to help understand the method of the present disclosure and its core ideas. Further, for those of ordinary skill in the art, there will be changes in the specific implementation and the scope of application according to the ideas of the present disclosure. In summary, the content of this specification should not be understood as a limitation of the present disclosure.

What is claimed is:

1. A method, comprising:

receiving downlink control information sent by a base station, wherein the downlink control information is configured to schedule a plurality of transmission time intervals;

determining, based on the downlink control information, a target resource corresponding to a target transmission time interval among the plurality of transmission time intervals; and determining a transport block size corresponding to each transmission time interval of the plurality of transmission time intervals based on the target resource and a modulation and coding scheme in the downlink control information, wherein the target transmission time interval is a transmission time interval among the plurality of transmission time intervals that is other than a first transmission time interval and a last transmission time interval of the plurality of transmission time intervals, and wherein the method further comprises: repeatedly transmitting a same redundancy version on the first transmission time interval and the last transmission time interval of the plurality of transmission time intervals.

2. The method of claim 1, wherein the target transmission time interval is a transmission time interval among the plurality of transmission time intervals that corresponds to a minimum amount of resources.

3. The method of claim 1, wherein the target transmission time interval is a transmission time interval among the plurality of transmission time intervals that corresponds to a maximum amount of resources.

4. The method of claim 1, wherein the same redundancy version is redundancy version 0 or redundancy version 3.

5. The method of claim 1, further comprising:

transmitting coded bits of different parts of the same redundancy version on the first transmission time interval and the last transmission time interval of the plurality of transmission time intervals.

6. The method of claim 1, wherein the plurality of transmission time intervals are consecutive in a time domain.

7. The method of claim 1, wherein the plurality of transmission time intervals correspond to resources in an unlicensed frequency band.

8. A communication device, comprising:

a processor; and a memory for storing one or more instructions executable by the processor; wherein the processor is configured to:

receive downlink control information sent by a base station, wherein the downlink control information is configured to schedule a plurality of transmission time intervals;

determine, based on the downlink control information, a target resource corresponding to a target transmission time interval among the plurality of transmission time intervals; and determine a transport block size corresponding to each transmission time interval of the plurality of transmission time intervals based on the target resource and a modulation and coding scheme in the downlink control information, wherein the target transmission time interval is a transmission time interval among the plurality of transmission time intervals that is other than a first transmission time interval and a last transmission time interval of the plurality of transmission time intervals, and wherein the processor is further configured to: repeatedly transmit a same redundancy version on the first transmission time interval and the last transmission time interval of the plurality of transmission time intervals.

9. A non-transitory computer-readable storage medium for storing a computer program, wherein the program, when executed by a processor, causes the processor to implement acts comprising:

receiving downlink control information sent by a base station, wherein the downlink control information is configured to schedule a plurality of transmission time intervals;

determining, based on the downlink control information, a target resource corresponding to a target transmission time interval among the plurality of transmission time intervals; and determining a transport block size corresponding to each transmission time interval of the plurality of transmission time intervals based on the target resource and a modulation and coding scheme in the downlink control information, wherein the target transmission time interval is a transmission time interval among the plurality of transmission time intervals that is other than a first transmission time interval and a last transmission time interval of the plurality of transmission time intervals, and wherein the acts further comprise: repeatedly transmitting a same redundancy version on the first transmission time interval and the last transmission time interval of the plurality of transmission time intervals.

10. The communication device of claim 8, wherein the target transmission time interval is a transmission time interval among the plurality of transmission time intervals that corresponds to a minimum amount of resources.

11. The communication device of claim 8, wherein the target transmission time interval is a transmission time interval among the plurality of transmission time intervals that corresponds to a maximum amount of resources.

12. The communication device of claim 8, wherein the same redundancy version is redundancy version 0 or redundancy version 3.

13. The communication device of claim 8, wherein the processor is further configured to:

transmit coded bits of different parts of the same redundancy version on the first transmission time interval and the last transmission time interval of the plurality of transmission time intervals.

* * * * *